United States Patent Office 3,519,468
Patented July 7, 1970

3,519,468
NOVEL WOOD STRUCTURES AND THEIR MANUFACTURE
Gordon E. Brown and Richard R. Huff, Seattle, Wash., assignors to Monsanto Company, St. Louis, Mo., a corporation of Delaware
No Drawing. Continuation-in-part of application Ser. No. 311,240, Sept. 24, 1963. This application Aug. 28, 1968, Ser. No. 755,791
Int. Cl. C08k 1/32, 1/70
U.S. Cl. 117—65.2                    2 Claims

ABSTRACT OF THE DISCLOSURE

In overlays for wood products formed from a mixture of wood fibers having a bulk density of up to about 0.16 gram/cc. and an aqueous phenol-formaldehyde resole resin solution, the improvement which comprises employing an acid catalyst to cure the resole resin and/or employing a sulfonated phenol-formaldehyde resole resin in admixture with the wood fibers.

---

This application is a continuation-in-part of copending application Ser. No. 311,240, filed Sept. 24, 1963.

BACKGROUND OF THE INVENTION

This invention relates to overlays for wooden substrates and is issued as U.S. Pat. No. 3,414,461.

In copending application Ser. No. 311,240, there is disclosed the method for making a wood product having a functional overlay thereon which comprises applying to the surface of a wood substrate a coating of an aqueous thermosetting resin solution in proportions of from about 0.5 to 10 pounds, based upon resin solids, per 1,000 square feet of substrate surface; then applying to the thus coated surface a layer of a mixture comprising (1) wood fibers having a bulk density of up to about 0.16 gram/cc. and (2) from about 5 to 50 weight percent of resin solids, based upon dry wood fibers, of an aqueous phenol-formaldehyde resole resin solution; then applying to the surface of the fibrous layer a coating of an aqueous phenol-formaldehyde resole resin solution in proportion of from 1 to 15 pounds, based upon resin solids, per 1,000 square feet of substrate surface; and then subjecting such assembly to heat and pressure to consolidate the assembly. The aqueous phenol-formaldehyde resole resin employed is an alkaline-catalyzed phenol-formaldehyde condensate having a number average molecular weight of up to about 5,000 and containing an average of from 1.3 to 3.0 mols of combined formaldehyde per mol of phenol. A critical requirement of the method disclosed is that the total moisture content of the overlay assembly (initial resin coating, fiber-resin mixture, and final resin coating) as measured just prior to hot-pressing and expressed as percent by weight of water based upon the dry wood fiber is within the range of from about $$\frac{Mn}{240} + 15$$

to about $$\frac{Mn}{200} + 40$$

wherein $Mn$ is the number average molecular weight of the phenol-formaldehyde resole resins employed.

The overlayed wood products disclosed in said co-pending application possess a combination of functional properties, such as improved tensile strength, and aesthetic properties, such as improved covering of defects and blemishes of wood substrates. Such a combination of desirable properties were unknown to the prior art taught overlays such as pre-formed sheet material, generally paper, impregnated with a resin which provides improved functional properties but are costly and deficient in covering and masking many surface defects and blemishes of wood substrates or finely divided wood materials, such as sawdust, in admixture with a resin as disclosed in U.S. Pats. 2,419,614 and 2,606,138 which provide good coverage of surface defects and blemishes but are deficient in tensile strength.

A more complete understanding of such improved functional overlay wood products and method of making same can be obtained from the full disclosure of copending application Ser. No. 311,240, which full disclosure is incorporated herein by reference.

SUMMARY

This invention is directed to improvements in the invention disclosed and claimed in copending application Ser. No. 311,240.

Typical objects of this invention are to provide (1) improved overlays possessing properties for wooden substrates, (2) improved method for manufacturing overlays possessing functional properties, (3) improved method for upgrading the functional and aesthetic characteristics of wood substrates, such as plywood and hardboard, and (4) wooden structures with surface integrity and durability.

In accordance with this invention, the method of making a wood product having a functional overlay thereon which comprises:

(a) Applying to at least one surface of a wood substrate a coating of an aqueous thermosetting resin (hereinafter referred to as Resin A), (b) Applying to said coated surface a layer of a mixture comprising (1) wood fibers having a bulk density of up to about 0.16 grams/cc. and
(2) from about 5 to 50 weight percent, of resin solids based upon the dry weight of the wood fiber, of an aqueous phenol-formaldehyde resin (hereinafter referred to as Resin B), (c) Applying to the surface of the wood fiber/phenolic resin layer a coating of Resin B, and (d) Subjecting the resulting assembly to heat and pressure to consolidate and cure the assembly;

is improved by employing an acidified aqueous phenol-formaldehyde resin solution preferably to a pH of up to about 3 and/or a sulfonated phenol-formaldehyde resin having a number average molecular weight of up to about 5,000 and containing an average of from 1.3 to 3 mols of combined formaldehyde and from 0.1 to 0.3 mol of combined sulfur per mol of phenol.

DESCRIPTION OF PREFERRED EMBODIMENTS

The following examples are presented in illustration of the invention and as such are not intended as specific limitations thereon.

Example I

A 5-ply 13/16" Douglas fir plywood panel measuring 5" x 10" is uniformly spray coated with about 0.8 gram, per panel, of an aqueous alkaline solution of a phenolic resin containing about 30% resin solids by weight and prepared by condensing 1 molar proportion of phenol with about 2.1 molar proportions of formaldehyde in the presence of 0.6 molar proportion of sodium hydroxide under reflux conditions. To the coated panel is then applied, using a gravity duster, about 10 grams of a mixture of wood fibers having a bulk density of about 0.065 gm./cc. and a resin solution acidified with $H_2SO_4$ to a pH of about 1.5 of a phenolic resin containing about 39% resin solids by weight and prepared by condensing 1 molar proportion of phenol with about 2.25 molar proportions of formaldehyde in the presence of 0.2 molar proportion of sodium hydroxide under reflux conditions. The wood fiber-phenolic resin mixture contains about 22% resin solids by weight and about 8.5% water by weight. An overspray of 1.2 grams of an aqueous solution containing about 40% resin solids by weight of the same phenolic resin used in the wood fiber-phenolic resin mixture is then applied. Finally, the entire assembly is hot pressed for about 2 minutes at 360° F. and 200 p.s.i. The overlayed plywood panel obtained exhibits functional and aesthetic properties comparable to those obtained using a non-acidified aqueous phenol-formaldehyde resole resin solution. A marked processing advantage is realized by the considerably shortened press time required to cure and consolidate the overlay assembly.

Example II

This example illustrates the preparation of a sulfonated phenol-formaldehyde resole resin.

| Material: | Parts |
|---|---|
| First phenol | 108 |
| Sulfuric acid (93% aqueous solution) | 58 |
| First water | 148 |
| 50% aqueous sodium hydroxide | 71 |
| 50% aqueous formaldehyde | 288 |
| Second phenol | 165 |
| Second water | 162 |

The first phenol and the sulfuric acid are charged to a stainless steel reactor equipped with means for agitation, cooling and reflux and then heated to 210° F. and held thereat, amid agitation, for about 60 minutes. The first water is then charged followed by thorough mixing. Next charge the sodium hydroxide slowly, maintaining the batch temperature below about 205° F. with cooling and/or refluxing. Check the pH and adjust if necessary to a pH of from 8.5–9.5. Adjust the batch temperature to below 130° F. and charge the formaldehyde. Heat to about 195–200° F., maintaining this temperature for about 1 hour, at which point the second phenol is charged, and then continue heating at said temperature for an additional 2¼ hours. Then charge the second water and heat at 190–200° F. until a 70° F. viscosity of about 30 on the MacMichael 30d scale is reached. Finally, cool the batch rapidly to about 60–70° F. The resulting 42% solids aqueous resin has a pH of about 8.0 and a mol ratio of 1:1.65:0.19 phenol:formaldehyde:sulfuric.

Example III

This example illustrates the preparation of a sulfonated phenol-formaldehyde resole resin.

| Material: | Parts |
|---|---|
| First phenol | 99 |
| Sulfuric acid (93% aqueous solution) | 53 |
| First water | 145 |
| 50% aqueous sodium hydroxide | 54 |
| 50% aqueous formaldehyde | 302 |
| Second phenol | 151 |
| Second water | 196 |

The first phenol and the sulfuric acid are charged to a stainless steel reactor equipped with means for agitation, cooling and reflux and then heated to 210° F. and held thereat, amid agitation, for about 60 minutes. The first water is then charged followed by thorough mixing. Next charge the sodium hydroxide slowly, maintaining the batch temperature below about 205° F. with cooling and/or refluxing. Check the pH and adjust if necessary to a pH of from 8.5–9.5. Adjust the batch temperature to below 130° F. and charge the formaldehyde. Heat to about 195–200° F., maintaining this temperature for about 1 hour, at which point the second phenol is charged, and then continue heating at said temperature for an additional 2¼ hours. Then charge the second water and heat at 190–200° F. until a 70° F. viscosity of about 50 on the MacMichael 30d scale is reached. Finally, cool the batch rapidly to about 60–70° F. The resulting 40% solids aqueous resin has a pH of about 7.5 and a mol ratio of 1:1.9:0.19 phenol:formaldehyde:sulfuric.

Example IV

A 5-ply 1¾₆" Douglas fir plywood panel measuring 5" x 10" is uniformly spray coated with about 0.8 gram of an aqueous alkaline solution of a phenolic resin containing about 30% resin solids by weight and prepared by condensing one molar proportion of phenol with about 2.1 molar proportions of formaldehyde in the presence of 0.6 molar proportion of sodium hydroxide under reflux conditions. To the coated panels is then applied, using a gravity duster, about 10 grams of a mixture of wood fibers having a bulk density of about 0.065 gm./cc. and a resin solution as prepared in Example II. The wood fiber-phenolic resin mixture contains about 22% resin solids by weight and about 8.5% water by weight. An overspray of 1.2 grams of the aqueous resin solution of Example II is then applied. Finally, the entire assembly is hot pressed for about 6 minutes at 360° F. and 200 p.s.i. The overlayed plywood panel obtained exhibits functional and aesthetic properties comparable to those obtained using a non-sulfonated phenol-formaldehyde resole resin.

Example V

Example IV is repeated except that the phenolic resin solution of Example II as employed is acidified with sulfuric acid to a pH of about 1.5. The overlayed plywood panel obtained exhibits properties comparable to those obtained using a non-acidified, non-sulfonated phenolic resin. However, the press-time required is reduced to about 1 minute.

Various types of wood substrates may advantageously be overlaid in accordance with this invention. Plywood is, of course, most commonly treated in this fashion and is of particular utility in this regard. However, particle board is making significant inroads in, e.g., paneling, etc. and may admirably be overlaid in this fashion. Similarly, lumber material may advantageously be overlaid in this fashion. In brief, wood in any shape or form may be employed as the substrate in the practice of this invention.

One or more surfaces of the wooden substrate may be overlaid in accordance with this invention. However, in many instances it will not be necessary that all surfaces of the substrate be so treated. For example, except for only exceptional uses, plywood is generally furnished with only one finished face. Similarly, the products of the invention may only require one functional surface for many intended uses, e.g., wall paneling, flooring, countertops, etc. In other uses, e.g., as reusable concrete forms, all surfaces may be overlaid.

As heretofore stated, the resins employed in formulating the overlays of this invention may be divided into two classifications in terms of their manner of use in the overlay. For clarity of discussion herein, the thermosetting resin applied to the substrate as a glueline or undercoat has arbitrarily been designated Resin A and the aqueous phenol-formaldehyde resin used in the wood/fiber phenolic resin mixture and in the overcoating has arbitrarily been designated as a B type phenolic resin.

It has been observed that little or no criticality exists as to the nature of Resin A. The examples show the use of a highly alkaline phenolic resin of the type taught in many patents; e.g., Redfern Re. 23,347, Van Epps 2,360,376, Stephan et al., 2,437,981, etc. However, equivalent results may be obtained substituting any thermosetting adhesive resin such as, for example, other phenol-formaldehyde condensates including those described therein as Resin B, aminoplasts such as, e.g. melamine-formaldehyde, urea-formaldehyde, etc., condensates, epoxy resins, proteinaceous adhesives, etc. The resins are generally employed in the form of aqueous solutions or dispersions. A coverage of at least 0.5 and preferably at least 1 pound, based upon resin solids, per 1,000 square feet of substrate surface has been found desirable to prevent possible delamination of the overlay from the substrate during subsequent use. A commercially practical range of from about 1 to 3 pounds per 1,000 square feet balances cost against performance to provide excellent results. However, similarly excellent results have been observed using 10 pounds, or more, based upon resin solids, per 1,000 square feet.

There is, however, a great deal of criticality in the nature of the B type resin in order that the overlay prepared shall have the desired functional properties. Resin B is then an aqueous solution of an alkaline-catalyzed phenol-formaldehyde resole characterized by having a number average molecular weight of from about 105, i.e., monomethylol phenol, to 5,000 and containing an average of from about 1.0 to 3.0 mols, and preferably from about 2.0 to 3.0 mols, of combined formaldehyde per mol of phenol. In a preferred embodiment, sulfonated phenolic resins having a number average molecular weight of up to about 5,000 and preferably from about 140 to 350 are employed. As a further refinement, maximum functional properties are obtained using, as Resin B, phenolic resins which have been prepared using milder alkaline, e.g., lime, catalysts which serve to maximize the molar ratio of formaldehyde to phenol in the resin at relatively low molecular weights. In another preferred embodiment, the resins are acidified prior to use to a pH of up to 3.

In the wood fiber/phenolic resin mixture, it is generally preferred to employ from about 5 to 50 weight percent, of resin solids based upon dry wood fiber, of the B type resin. At less than about 5% resin content, the desired functional properties of the finished overlay are not obtained, while at greater than about 50% resin content the mixture becomes difficult to deposit on the substrate. Best performance is obtained using from about 7 to 20 weight percent of resin solids, with optimum results being obtained at about 12 to 14 weight percent.

As stated, the B type resin is also used as the overcoating resin, i.e., as the resin coating applied to the surface of the previously deposited wood fiber/phenolic resin mixture. In this regard, it has been found that a coverage of at least 1, and preferably at least 2 pounds, based upon resin solids, per 1,000 square feet of substrate surface is desirable to insure good surface integrity; i.e., continuity of surface without free fibers appearing in the surface. Economically, coverages of more than about 15 pounds per 1,000 square feet cannot be justified. Generally, a maximum coverage of about 6 pounds per 1,000 square feet is preferred and a range of from about 3 to 4 pounds per 1,000 square feet appears optimum in terms of performance and cost.

In various embodiments, in this overcoating and/or in the resin-fiber mixture, Resin B may contain as modifiers, various polymeric and/or non-polymeric compositions. For example, the addition of an oil or wax to the resin solution improves the water-resistivity as well as the aging, i.e., durability and weathering characteristics of the overlay. Such oil or wax modifiers are particularly pertinent, for example, to the provision of re-usable concrete forms, providing a lubricated surface to aid in separating the form from the concrete. Partability may also be provided using soaps, surfactants or other parting agents as modifiers. Aqueous emulsions or suspensions of vinyl or vinylidene polymers such as, e.g., styrene-maleic anhydride copolymers, polyvinyl alcohol polymers, polyvinyl acetate polymers, etc. may be incorporated as modifiers to impart specialized surface properties to the overlay, e.g., flexibility, plasticization, etc. Again, in other embodiments, decorative materials such as pigments, metal flake, stone chips, silica, wollastonite, etc., may be added to the overcoating resin solution, i.e., to Resin B, to provide surfaces which are decorative as well as functional. Similarly, other resins such as melamine, formaldehyde, urea-formaldehyde, acrylic epoxy, etc., resins may be added.

Turning now to discussion of another critical factor necessary to obtain the desired functional properties, it has been found that not all types of particulate wood can be used. Particulate wood of the type characterized by sawdust and sanderdust, that is, more or less cubical or otherwise regular in shape, cannot be used in the practice of this invention since they fail to provide the functional properties sought. Rather, the wood particles employed in the practice of this invention are fibrous; i.e., dimensionally irregular in the sense of having a single dimension of significantly greater magnitude than the other dimensions. Thus, acceptable wood fibers may be visualized as resembling match sticks, wool, strings, etc. For more accurate definition, the acceptable wood fibers are delimited herein by their bulk density, as measured by a method hereinafter set forth, which provides a measurable indication of their shape. Thus, for the purposes of this invention, wood fibers having a bulk density of up to about 0.16 gram/cc. have been found to provide overlays having suitable functional properties. Best results, however, are obtained using wood fibers having a bulk density of 0.10 gram/cc. or less. In the examples contained herein two types of wood fibers have been used for comparative purposes. On the acceptable side, there is used low bulk density wood fibers having a bulk density of about 0.065 gram/cc. On the unacceptable side, there is used medium bulk density wood particles having a bulk density of about 0.165. When interpreting the results reported herein it must be remembered that the unacceptable wood particles are only slightly outside of the acceptable range and still provide measurable though unacceptable functional properties. They are not to be considered comparable to sawdust or sanderdust which provides considerably worse and totally unacceptable functional properties.

The wood fibers employed in the practice of this invention may be prepared, for example, by defibrating steamed or unsteamed wood chips in a conventional defibrator, e.g., Bauer, Asplund, etc. The defibrator plates may be preset to provide wood fibers of the desired bulk density. While it is preferred to employ wood fibers obtained from soft woods such as, for example, Douglas fir, hemlock, pine, cedar, white fir, etc., fibers any available species of wood may be used. Thus, results equivalent to those set forth in the examples are obtained using, for example, gum, willow, poplar, cherry, birch, persimmon, sycamore, ash, elm, maple, beech, hackberry, oak, hickory, etc.

The bulk densities delimited herein with respect to the wood fibers are determined according to the following procedure. Five hundred ml. of loosely dispersed wood fibers discharged from an agitator are collected in a 500 ml. graduate. A 100 gram weight having a diameter slightly less than the inside diameter of the graduate is set down lightly on top of the fibers. The graduate is then placed for 1 minute in a vibrator having a displacement of about 0.165 inch and running at a rate of about 1225 oscillations per minute. The volume of wood fibers in the graduate is then noted and the wood fibers are weighed.

With regard to the quantity of wood fiber/phenolic resin mixture employed, it is merely necessary to employ sufficient to form a finished, or consolidated, overlay having sufficient thickness to provide adequate functional properties. For example, it has been observed that a total consolidated overlay thickness of at least about 6 mils is desired to provide the requisite strength and other functional properties. As a practical matter, there appears to be no apparent advantage in providing overlays having a total consolidated thickness in excess of about 50 mils. A range of from about 10 to 20 mils and particularly about 13 to 15 mils appears to be preferable.

At this point, it would be well to mention moisture content, which has been found to play an important role, and which is interrelated with the molecular weight of the B type resin. The interdependence of the total moisture content with the molecular weight of Resin B is such that total overlay moisture contents falling within the following prescribed maximums and minimums, as measured just prior to hot-pressing and based upon dry wood fiber, should be observed:

$$\text{Minimum moisture content} = \frac{Mn}{240} + 15$$

$$\text{Maximum moisture content} = \frac{Mn}{200} + 40$$

where $Mn$ represents the number average molecular weight of the B type resins used in the wood fiber/phenolic resin mixture and in the overspray, taken in combination. Moisture, if any, present in the wood veneers of the substrate is not included in calculating the total overlay moisture content.

Thus, a total overlay moisture content of from about 15 to 65 weight percent, based upon dry wood fiber, has been found to be desirable. At less than the prescribed minimum moisture, the finished overlay exhibits poor surface integrity and low abrasion resistance. Moreover, the surface lacks the requisite strength. At more than the prescribed maximum moisture content the wood becomes darkened and there is excessive grain raise. Preferably, total overlay moisture contents of from about 18 to 25% are employed.

Resin A, i.e., the glue-line or undercoating resin, may be applied by any conventional technique. Good results have been obtained using a spray coating technique. However, equivalent results are obtainable using other conventional coating methods such as, e.g., curtain coating, glue spreader, felt roll, etc. It has been observed that the coated panel may be set aside or stored for several hours or even overnight before proceeding to the next step. Therefore, it is not necessary in the practice of this invention to endeavor to control or minimize drying of the glue-line prior to deposition of the wood fiber mat.

The wood fiber-phenolic resin mixture is then deposited upon the coated surface. Excellent results have been obtained by felting out a uniform mat from a conventional air-borne fiber felter. In variations on this embodiment, the mat may be felted on the coated panel or more preferably, may be felted on a vacuum screen and then transferred to the coated substrate. Various transferal methods are known to the art; e.g., vacuum transfer units.

In one variation the felted mat may be rolled up, i.e., similar to batting, and later unrolled upon the coated substrate. Other means for securing deposition of the wood fiber/phenolic resin mixture on the coated substrate will, of course, be obvious to those skilled in the art.

The overcoating of the B type resin may also be applied by any conventional technique. Again, good results have been obtained using spray coating. However, other means, e.g., curtain coating, etc., capable of depositing relatively uniform coatings without disrupting the fibrous structure may be employed.

The overlay is then consolidated under pressure and heat. It may be well, at this point, to refer back to earlier comments made with respect to the moisture content of the overlay. It is desirable to hot press the structure within a period of time such that the total moisture content is within the heretofore delimited range. More preferably, however, hot pressing is effected while the moisture concentration in the overcoating is greater than that in the wood fiber/phenolic resin mat. This requires pressing before the overlay structure reaches equilibrium with respect to moisture. Conventional plywood pressing conditions are employed, but it is to be understood that this invention is not limited in this regard. Typical pressing temperatures are from 240 to 400° F. In general, the pressing cycle employed can be considerably shorter than that used in preparing conventional high density overlays.

The functional overlays provided by the practice of this invention are possessed of a multitude of desirable surface properties. For example, surfaces which are resistant to abrasion, water, grain-raise, checking alkalies, physical damage during handling, etc. are obtained. These features, when combined with the excellent tensile strength of the surface, renders plywood panels, so constructed, suitable for use as, e.g., reusable concrete forms, structural panels for home and industrial use, etc. It has also been observed that the surfaces obtained require no further preparation for finishing with, e.g., paint, baking enamels, etc. In this latter regard, the surfaces exhibited good adhesion, good paint hold-out, low permeability, superior surface integrity and strength to resist blistering and to provide a smooth grain-free surface. However, with regard to paint hold-out, the additional use of a paper asset in the overlay provides more uniform results. If desired, decorative thermoplastic films may be applied. These panels will also find significant use in applications wherein the surfaces are subjected to wear; e.g., countertops, floors, subflooring, etc.

A remarkable advantage obtained by acid curing the phenolic resin during preparation of the functional overlays described herein is the reduction in press time required to form the consolidated overlay. The rapid partial curing of the overlay obtained by acidifying the phenolic resin permits preparation of the overlay as an in-process article which can be stored, handled or transported before its use as a component in the preparation of laminated materials. Another advantage obtained by use of sulfonated phenolic resins permits improved solubility of the resin system and greater uniformity in mixing the resin with the wood fibers used in the overlay.

It is obvious that many variations may be made in the products and processes set forth above without departing from the spirit and scope of this invention.

What is claimed is:

1. The method of making wood products having a functional overlay, which comprises:
    (a) applying to the surface of a wood substrate a coating of an aqueous thermosetting resin solution in proportions of from about 0.5 to 10 pounds, based upon resin solids, per 1,000 square feet of substrate surface,
    (b) applying to the coated surface a layer of a mixture comprising (1) wood fibers having a bulk density of up to about 0.16 gram/cc., and (2) from about 5 to 50 weight percent of resin solids based upon dry wood fibers, of an aqueous phenolformaldehyde resole resin solution having a pH of up to about 3.0,
    (c) applying to the surface of the fibrous layer a coating of an aqueous phenol-formaldehyde resole resin solution having a pH of up to about 3.0, in proportion of from 1 to 15 pounds, based upon resin solids, per 1,000 square feet of substrate surface, and
    (d) subjecting the resulting assembly to heat and pressure to consolidate the assembly;

said aqueous phenol-formaldehyde resole resin solutions employed in steps (b) and (c) being independently selected acidified aqueous solutions of alkaline-catalyzed condensates of from 1.0 to 3.0 mols of combined formaldehyde per mol of phenol of sulfonated phenol and having a number average molecular weight of up to about 5,000; the total moisture content of the several components of the overlay as applied in steps (a), (b) and (c) and as measured just prior to hotpressing and expressed as percent by weight of water based upon the dry wood fiber being within the range of from about $$\text{Minimum moisture content} = \frac{Mn}{240} + 15$$

to about $$\text{Maximum moisture content} = \frac{Mn}{200} + 40$$

wherein $Mn$ is the number average molecular weight of the aqueous phenol-formaldehyde resole resins employed in steps (b) and (c).

2. The method of claim 1 wherein said aqueous phenol-formaldehyde resole resin solution is an aqueous solution of a sulfonated phenol-formaldehyde resole resin having a number average molecular weight of from about 140 to about 350.

References Cited

UNITED STATES PATENTS

| | | | |
|---|---|---|---|
| 2,414,415 | 1/1947 | Rhodes | 161—262 |
| 2,606,138 | 8/1952 | Welch | 117—65.2 |
| 3,180,784 | 4/1965 | Meiler | 161—262 |
| 3,414,461 | 12/1968 | Brown et al. | 161—151 |
| 2,389,418 | 11/1945 | D'Alelio | 161—262 |
| 2,419,614 | 4/1947 | Welch | 161—262 |

MORRIS SUSSMAN, Primary Examiner

U.S. Cl. X.R.

117—72. 148; 161—162, 262

UNITED STATES PATENT OFFICE
CERTIFICATE OF CORRECTION

Patent No. 3,519,468            July 7, 1970

Gordon E. Brown et al.

It is certified that error appears in the above identified patent and that said Letters Patent are hereby corrected as shown below:

Column 1, line 24, after "1963" insert -- and issued as U. S. Pat. No. 3,414,461 --; line 28, cancel "and issued as U. S. Pat. No. 3,414,461". Column 4, lines 67 and 68, "wood/fiber phenolic resin" should read -- wood fiber/phenolic resin --. Column 5, line 2, "therein" should read -- herein --; line 71, "phenol of sulfonated phenol" should read -- phenol or sulfonated phenol --.

Signed and sealed this 16th day of February 1971.

(SEAL)
Attest:

Edward M. Fletcher, Jr.            WILLIAM E. SCHUYLER, JR.
Attesting Officer            Commissioner of Patents